SYSTEM FOR TRANSMITTING AND REPRODUCING PRINTED MATTER

Filed Sept. 18, 1964 3 Sheets-Sheet 1

INVENTOR.
EDGAR F. SCHOLZ

BY [signature]

ATTORNEY

SYSTEM FOR TRANSMITTING AND REPRODUCING PRINTED MATTER

Filed Sept. 18, 1964 3 Sheets-Sheet 2

INVENTOR
EDGAR F. SCHOLZ
ATTORNEY

SYSTEM FOR TRANSMITTING AND REPRODUCING PRINTED MATTER

Filed Sept. 18, 1964

INVENTOR
EDGAR F. SCHOLZ

ATTORNEY

United States Patent Office 3,369,073
Patented Feb. 13, 1968

3,369,073
SYSTEM FOR TRANSMITTING AND REPRODUCING PRINTED MATTER

Edgar F. Scholz, Burgallee 31, Bad Nauheim, Germany

Filed Sept. 18, 1964, Ser. No. 397,454
Claims priority, application Germany, Sept. 25, 1963, Sch 33,918
10 Claims. (Cl. 178—6.6)

ABSTRACT OF THE DISCLOSURE

A communication system for transmitting printed matter via conventional scanning equipment, television stations and television receivers by means of repeatedly scanning the same raster and causing the resulting image to appear distorted on a few horizontal lines of the video screen adjacent to a border area. A device focuses, either electronically or optically, the distorted image and feeds this information to a photocopying machine for making a readable copy of the printed subject matter.

This invention relates to a method and apparatus for transmitting printed matter in an unintelligible manner, utilizing conventional television equipment, and for receiving this intelligence and photocopying a clear image thereof.

In the prior art it is known to transmit, or beam, newspaper or other like material to receiving equipment in remotely located private homes. At the latter location the signal or image is recorded or reproduced. Such methods are generally accomplished using facsimile, point and line scanning, or wireless teletype equipment. For the average individual or organization the use of such equipment is often excessively expensive. The need for such equipment does arise when people are located in remote rural areas and/or at not readily accessible locations. As an economical solution to this problem, it has already been proposed to utilize conventional television receivers which are available in most private homes. By this method whole newspaper pages are transmitted as still pictures, normally during the night hours when no other conventional telecasting takes place. The pictures are then copied by a suitable camera. While this known system is simple it has, nevertheless, a number of serious disadvantages and as a result it has not been commercially successful.

It is well known that the line standard of ordinary television receivers is insufficient to provide the resolution power to reproduce a readable newspaper page of average dimension and having a normal print size.

The system of the prior art necessitates placing a serial camera in front of the receiver and synchronizing the camera with the rate of transmission. The camera must be again removed each time for viewing of the regular program. This requirement causes a hardship for the technically untrained as well as for others since this task must be performed while no regular telecasting takes place, which in almost all situations means very late at night. An additional problem posed by the method of the prior art is that non-participating viewers and/or reproducers cannot readily be excluded.

It is therefore the primary object of this invention to provide a method and apparatus, for transmitting newspapers or the like over conventional television equipment and reproducing the video image, in a manner avoiding the shortcomings of the prior art.

It is a more specific object of this invention to provide a method and apparatus aforedescribed, which scans and transmits only minute portions of the printed matter at one time to preclude benefitting unauthorized participants.

It is a further object of this invention to provide a method and apparatus of the nature as above described, in which the video image is unintelligible until a conversion system brings the same into focus and provides an image of a clarity which is normally not obtainable on the television screen and particularly not near the marginal regions thereof.

It is a still further object of this invention to provide a method and apparatus of the nature above referred to in which the newspaper print is reproduced on paper in essentially the same quality as appearing on the original. This process taking place simultaneously with normal telecasting operations but without any interference therewith. Hence no additional burden is placed upon the picture tube and the life thereof is not reduced.

It is a still further object of this invention to provide an apparatus which includes a means for a very low cost reproduction of the video image.

One of the aspects of the present invention resides in the provision of a method for scanning and transmitting a newspaper, or similar matter, using the conventional television medium and for reproducing the transmitted printed matter. In more detail, this aspect requires repeatedly scanning, i.e., line by line, the same raster of the newspaper to obtain for each line a number of identical video pulses. These pulses are converted into horizontal lines on the television screen with the result of a distorted image. Thereafter these horizontal lines are vertically brought into focus by a conversion system, for instance optical, to produce a clear image which is photocopied.

And another aspect of the present invention resides in the provision of an apparatus for carrying out the method. This apparatus is adapted to receive video pulses of which a number are identical as a result of repeatedly scanning the raster of printed material. Included is a conventional television receiver having a picture tube generating a plurality of horizontal lines on its screen. An optical or electrical system is mounted proximate to the screen to focus marginally located horizontal lines of the screen transverse to their direction. An arrangement is provided whereby the image is photocopied. This arrangement may be of a photographic, electrolytic or electrostatic nature.

For a better understanding of the present invention, together with other and further objects thereof, reference is had to the following description taken in connection with the accompanying drawings, and their scope will be pointed out in the appended claims.

In the drawings:

FIGURE 1 is an over-all schematic and in part diagrammatic view of the invention, excluding however the reproduction facilities;

FIGURE 2*a* is an elevational view of a slitted plate, shown translucent for purposes of illustration only, overlaying some printed matter;

FIGURE 2*b* is a view similar to FIGURE 2*a* showing the plate having a slit and the fragments of the printed matter appearing therein;

FIGURE 2*c* is an elevational view of a television screen showing a vertical enlargement, slightly out of proportion, of the fragments shown in FIGURE 2*b* and produced in accordance with this invention;

FIGURE 2*d* to 2*f* illustrate schematically, in side elevation, a picture tube and arrangements for converting the video image into a suitable electrical signal;

Figure 1:
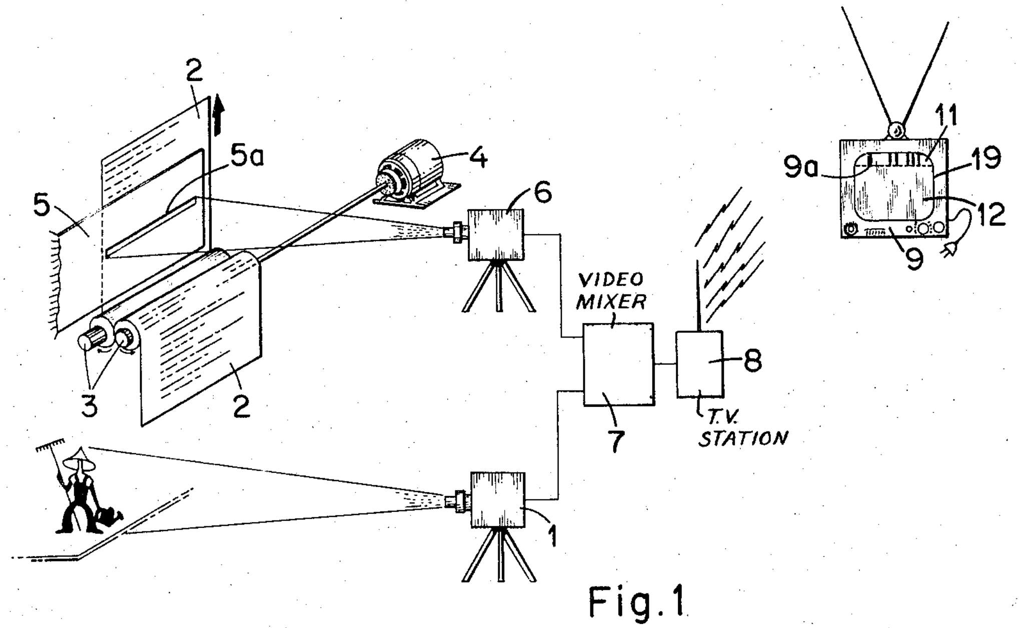

Referring now to FIGURE 1 there is shown a television camera 1 scanning a performance in the conventional manner. Alternatively, other conventional means can be employed, such as a plurality of cameras, film scanners, video tape recorders or the like (not shown). In any event, the device 1 is electrically connected to a video mixer 7 to transmit video pulses thereto.

A newspaper or other printed subject matter 2, which is to be transmitted and beamed over the television system, is passed between a pair of drive rolls 3, suitably driven by a motor and speed reducer 4, and behind an opaque plate 5 having a longitudinally extending, vertically narrow, slit 5*a*. The vertical width of the slit opening 5*a* is approximately equal to the width of a standard writing character, e.g. the mark hyphen. The picture between the slit is received by a camera 6 which scans and transforms this image into suitable electrical impulses. Preferably, the camera is equipped with a cylindrical lens and a beam shaped picture tube.

The rate of speed of the paper advance mechanism 3 and 4 is suitably synchronized with the frequency of the pulse generator of the camera 6. In the preferred embodiment of this invention, the fragments visible in slit 5*a* are repeatedly scanned line by line. The series of identical pulse sequences which are obtained from repeatedly scanning a single line of the newspaper is used to modulate the first or last lines of the raster of a television picture as hereafter further explained.

The video pulses generated by the cameras 1 and 6 are combined in the video mixer 7. The video mixer is of the type which also functions as a switch to sequentially receive the video pulses from cameras 1 and 6. These pulses or pictures are transmitted to a television station 8 and beamed therefrom for reception on a standard television set 9. The result is a two part image, see FIGURE 2 numerals 11 and 12, on the picture tube screen 19 of set 9. The pulses from camera 1 establish an image of the regular television show on the screen 19 which may cover up to 95 percent of the effective area of the screen. While the pulses from camera 6 project an image of the printed matter in an area defined by a relatively few horizontal lines which are marginally located at the upper or lower border of the screen as shown. The line 9*a* between part 11 and 12 is imaginary. This arrangement facilitates line by line reproduction of the newspaper without interfering with any regular program. Moreover, since a line as scanned does not reveal a full letter or character, and several consecutive horizontal lines are vertically distorted due to the fact that they are identically modulated, it is impossible to read or understand the video picture of part 11 without means for compensating for the multiplication of the scanned line perpendicular to the horizontal line direction.

Figure 2A:
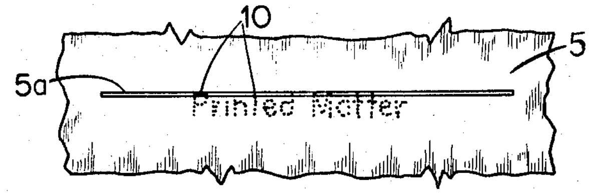
Figure 2B:
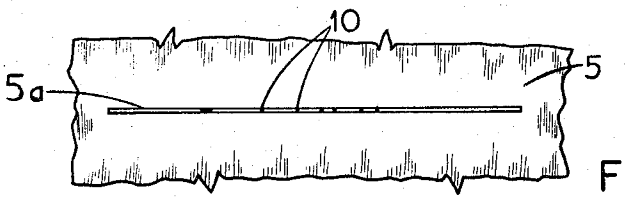
Figure 2C:
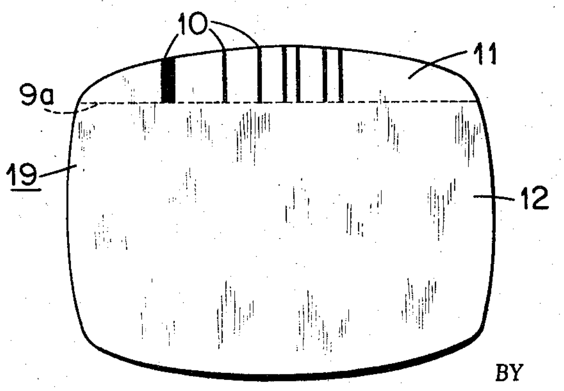

In FIGURE 2*a* portions of the slitted plate 5 are shown enlarged. For purposes of describing the invention some representative letters of the newspaper 2 are visibly arranged behind the plate of which only fragments 10 show up in the slit 5*a*. Only the fragments 10 are repeatedly scanned by camera 6. These are shown by themselves in FIGURE 2*b*. The FIGURE 2*c* shows, for exemplary purposes, screen 19 with an image resulting from the repeatedly scanned slit 5*a* exposing the characters 10 of FIGURE 2*b*. The vertical enlargement of each character fragment facilitates the reception and reproduction of all the intelligence conveyed by the television station regardless of the considerably deviating geometric and operating qualities of picture tubes.

In order to reduce the enlarged fragments 10 to original size, the zone 11 of screen 19 is scanned and focused by an optical or electrical system. The resulting image is then photocopied by a photographic, electrolytic or electrostatic process hereafter further described. The photographic method being in most instances more expensive to operate.

For the last two mentioned methods it is necessary to transform the difference in brightness of zone 11, and the characters or parts thereof appearing therein, FIGURE 2*c*, into electrical signals. A number of conventional light responsive photoresistors are well known in the art and suitable for this purpose. For instance light sensitive semiconductors, such as selenium, cadmium-sulfide, etc., whose conductivity changes according to the intensity of light exposure can be utilized.

Figure 2D:
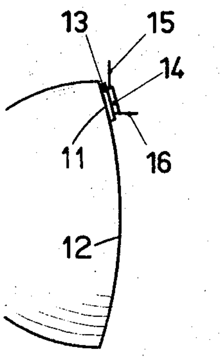

Referring now specifically to FIGURE 2*d* there is shown a light responsive photoelectric member attached to screen 19 of the picture tube. This member is composed of a strip of cellophane material 13 glued onto zone 11 above described. The width and length of the strip 13 is about the same as the corresponding dimensions of zone 11. The surface of the strip 13 facing in the direction opposite to that of the screen is covered with a layer of photoelectrically responsive semiconducting material 14 in which portions of metal strips 15 and 16, such as metal foils, are embedded. A metallic coating (not shown) applied onto the borders of the semiconductor layer 14 may be used as an alternative construction. In either case, one metal strip, e.g. 16, is separated into a row of contacts. This is most readily accomplished by cutting or etching the strip 16 into very small single contacts each having a width transverse to the horizontal lines of picture tube screen 19 approximating that of the scanning element or character. The single contacts are connected with each other only through the photoresistor material 14. The outer ends of contact strips 15 and 16 protrude out of the semiconductor material 14 for electrical and/or physical coupling.

The horizontal resistance in the layer 14 may be increased by cutting the material 14 into narrow strips (not shown) perpendicular to the line direction of the screen. Preferably, the width of the strip equals the width of a scanning element.

Figure 2E:
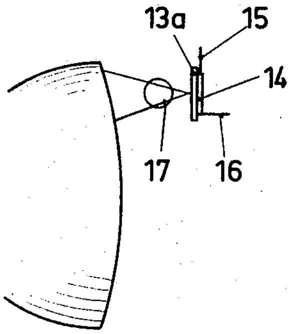

FIGURE 2*e* illustrates a modification of the invention described in connection with FIGURE 2*d*. A cylindrical lens 17 is interposed between the photoresistor denoted by numerals 14, 15 and 16. The lens has a longitudinal length approximating that of the length of screen 19 and is disposed proximate to zone 11 to focus the horizontal lines thereof in a vertical direction and upon a single horizontal line of contacts 16 embedded in layer 14. The photoelectric layer is secured to a rigid and translucent support 13*a* arranged in the focal line of the cylindrical lens 17.

Figure 2F:
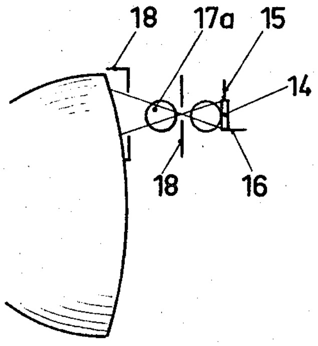

FIGURE 2*f* illustrates another modification. An optical system 17*a* comprising two or more glass rods or a glass profile rod (not shown) is interposed between the layer 14 and associated elements 15 and 16. The layer 14 may be glued or otherwise suitably supported on one glass rod facing in the same direction as above described. The system 17*a* may include screens 18 to reduce the effect of any scattered light.

Figure 3:
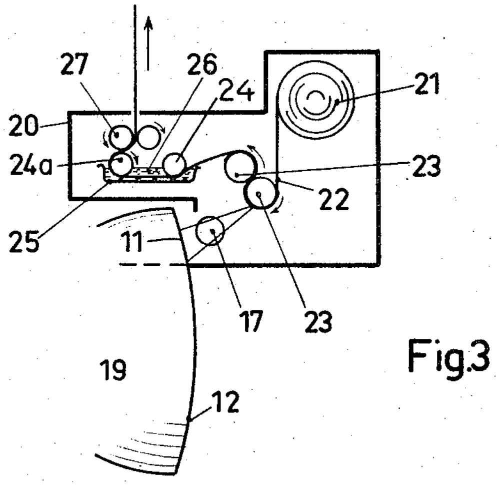
FIGURE 3 is a side elevational view showing schematically a video picture tube and a photographic apparatus adapted for reproducing portions of the video image.

Turning now to the reproduction units, there is shown in FIGURE 3 a photographic recording device for use in conjunction with the aforedescribed part of the invention.

The horizontal lines in zone 11 projecting identical fragments of printed material are focused by means of the suitably supported cylindrical lens 17 located in the housing 20. The housing 20 may be readily adapted for such support. The focal line of the lens 17 is directed upon photographic paper 22 which moves past this point from the supply roll 21 through a pair of suitably arranged take-up rolls 23. The photosensitive side of the paper 22 faces the television picture tube screen 19. The paper 22 is then passed into and through a tray 25, by means of guide rolls 24 mounted proximate thereto. The tray 25 contains a photographic developer solution effective to develop the paper to produce an image identical to the corresponding original printed matter 2. To vary the length of maintaining the paper 22 within the bath, it is of course possible to change the length of the tray 25. The paper is advanced by passing it with frictional engagement between guide roll 24*a* and drive roll 27. The drive roll 27 is suitably connected to a motor (not shown) so that the rate of advancing the paper is the same as the rate with which the original printed matter 2 is advanced by the mechanism 4, see FIGURE 1.

While the aforedescribed reproduction method is quite simple and very advantageous for certain applications, it is, however, recognized that the use of photographic paper is normally not very economical. In accordance with this invention other, and more economical, reproduction methods may be utilized such as the electrolytic process in which the color of chemically treated paper is changed by the application of an electric circuit, or more preferably, by the electrostatic method, generally referred to as xerography.

Figure 4:
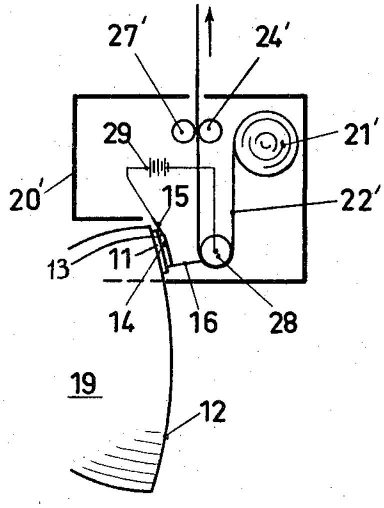
FIGURE 4 is a view similar to FIGURE 3 illustrating, schematically, an electrolytic apparatus adapted to reproduce portions of the video image.

FIGURE 4 illustrates electrolytic means for reproducing the video image appearing in zone 11 of the tube screen 19. The photoresistor assembly composed of an adhesive foil 13, or the like, and a layer of a light responsive semiconductor material 14 partly embedding contact 15 and 16, is assembled and secured as described in connection with FIGURE 2*d*, to the zone 11 of the screen substantially covering this part of the screen without however encroaching on zone 12.

A housing 20′ is placed substantially above the tube screen 19 with an overhanging portion having an aperture located adjacent to zone 11. Within the housing there is disposed a supply roll 21′ of chemically treated paper 22′ which is passed around a metal drum 28 and moved out of the housing by friction between drive roll 27′ and pressure roll 24′. One end of the drum 28 is electrically connected to a pole of a source for direct current 29, while the opposite pole or portion of the circuit is electrically coupled to the row of contacts 16 via the contact border 15 and the light sensitive material 14. The row of contacts 16 bear slightly against the paper 22′ in the vicinity of the drum 28.

In operation of the device shown in FIGURE 4, substantially no current flows between the voltage source 29 and the electrolytically responsive paper 22′ as long as the photoresistive layer 14 is not exposed to light, inasmuch as its resistivity is of a sufficient magnitude to prevent such flow.

Upon exposing certain portions of the horizontally extending layer 14 to light, emanating from zone 11, the resistance in the affected areas is appreciably reduced and current flows, as explained above, from the source 29 through the metal contact border 15 and through units of contacts 16 which are embedded in the particular, light exposed, areas of layer 14. In turn the conducting contacts transmit the current, in a varying degree of intensity, to the paper 22′ and the current flows through drum 28 back to source 29. As a result the paper will change color in the affected areas and produce a replica of the original printed matter.

Figures 5, 6, 7:
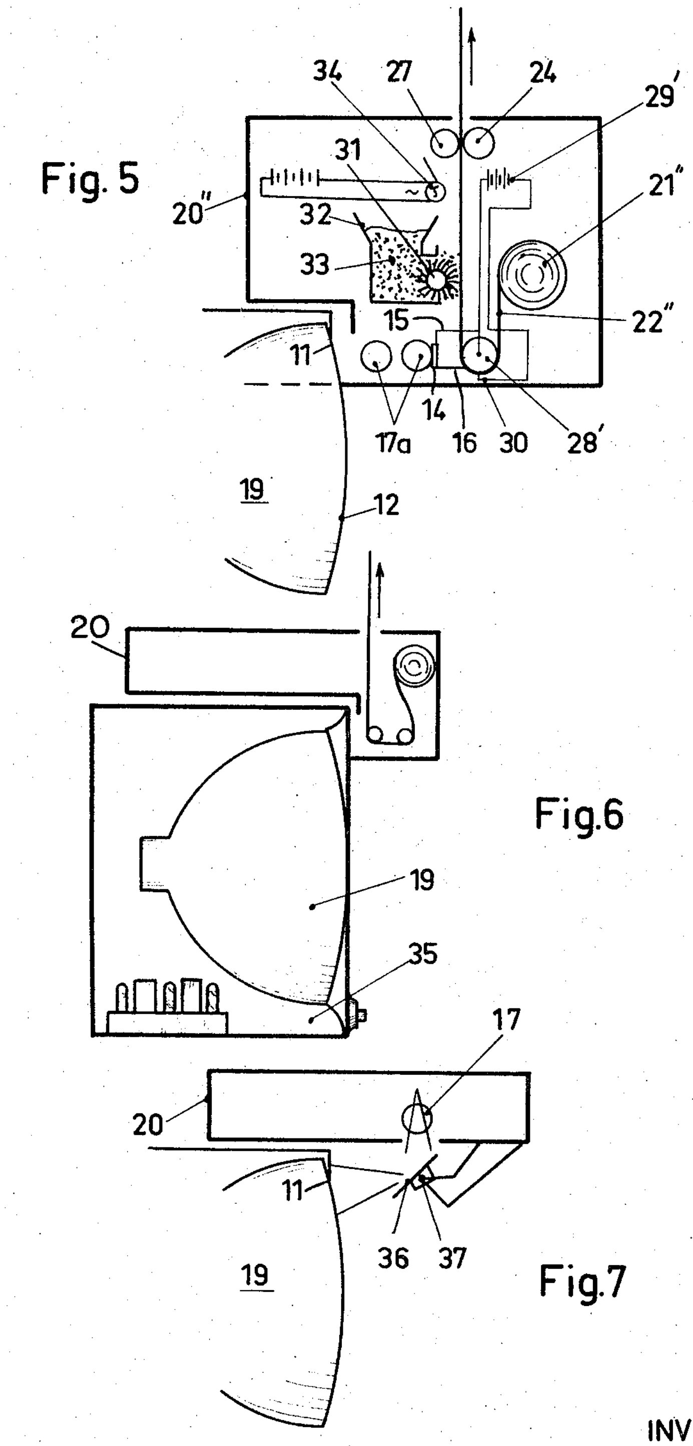
FIGURE 5 is also a view similar to FIGURE 3 illustrating, schematically, an electrostatic apparatus adapted for reproducing portions of the video image.
FIGURE 6 is a view similar to FIGURES 3 to 5 illustrating portions of a standard television receiver and associated reproduction apparatus.
FIGURE 7 is another schematic view similar to FIGURE 5 illustrating in elevation a modification of the optical system in accordance with this invention.

The xerographic reproduction method and apparatus therefor is shown in FIGURE 5. The video image appearing on screen zone 11 is focused by the cylindrical lenses 17*a* upon the photoresistor layer 14.

A housing 20″ is suitably disposed proximate to tube screen 19 with an opening thereof adjacent to the zone 11 and with the optical system, as exemplified by suitably supported lenses 17*a*, located close to the openings. In the housing 20″ xerographic paper 22″ from the supply roll 21″ is passed around the metal drum 28′. A relatively high voltage source 29′ is electrically connected with metal brush 30 bearing upon the paper 22″ and causes the paper surface to be uniformly charged with a potential of several thousand volts having a negative polarity.

The charged paper is advanced past the row of contacts 16 so as to be in electrical juxtaposition therewith. The light exposed areas of the layer 14 are weakened in their resistivity and hence the charge on the affected areas of the paper is relieved or dissipated through the photoresistor assembly, 14, 15 and 16, and can flow back to the power source 29′. Alternatively, little condenser plates (not shown) may be interposed between the insulating strip and the screen face 11. The resulting pulse can then be optically or electrically focused as above described. In any event, the remaining charge in these affected areas is now positive. The resulting charge distribution on the paper corresponds to the identical picture of characters scanned within slit 5*a*. The paper is then moved past a hopper-like dispenser 32 containing a so-called black powder, normally a mixture of a carrier and a resinous pigment. A rotating brush 31 applies this powder uniformly onto the paper as it passes by. The electrically charged surface of the paper 22″ repels the negatively charged black powder except those areas of the paper which are now of opposite polarity. The latter areas attract the powder and the sticky resin adheres thereto. At the next station a longitudinally extending incandescent lamp 34 serves to heat and melt the powder and glue the same to the paper. As in the above described embodiments, the paper is then moved by and passes between drive roll 27 and pressure roll 24.

The on and off operation of the devices shown in FIGURES 3 to 5 as well as the television set 35 can be automatically controlled by a suitable switch from a remote station utilizing signal frequencies, preferably in the ultrasonic frequency range, and transmitting same through the sound channel of the apparatus.

It will be appreciated by those skilled in the art, that the xerographic and the photographic methods, above described, provide a positive end product. On the other hand however, the electrolytic method described in connection with FIGURE 4 establishes a negative copy and under these circumstances it is necessary to start the process with a negative print as the original.

FIGURE 6 illustrates that any of the aforementioned housings, e.g. 20, may be placed upon the top surface of the television set 35 and fixed to portions thereof without actually requiring changes in the set itself. Very simple clamping means (not shown) is used to tie the housing 20 to the television set 35. The reproduction part of this invention may alternatively be secured underneath the television set 35 particularly when the zone 11 appears at the bottom of the picture tube screen 19.

A further modification of the invention is shown in FIGURE 7. Herein it is taken into consideration that there are at present a variety of picture tubes in existence which differ substantially in their structure. A longitudinally extending mirror 36 is disposed, by means not shown, in a position to reflect the image from zone 11 onto and through cylindrical lens 17 arranged within typical housing 20. The mirror 36 is angularly movable about the axis 37.

It will also be appreciated that the aforementioned devices, and particularly the latter one, may be further modified by substituting for the cylindrical lense 17, or any equivalent thereof, a concavely constructed mirror.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A system for scanning, transmitting and reproducing printed matter using the television medium comprising: video scanning means for repeatedly scanning the same raster of a given subject matter to produce a plurality of scan lines each containing identical video pulse trains; means for transmitting the video pulse trains for reception by a video receiver; means at the receiver for converting said pulse trains into a corresponding number of adjacent horizontal lines on the screen of a video tube, each individual scan line of a single scanned field being identical, thereby establishing a vertically extending distorted image composed of identically looking fragments, said lines constituting a comparatively small portion of the total screen area located proximate to the border of the receiver screen; copying means mounted proximate to said screen; and signal translation means interposed between said copying means and said screen effective to present a plurality of said screen lines transversely to their horizontal direction and to transmit the resulting intelligence to said copying means.

2. A system according to claim 1, wherein said means for transmitting is effective for emitting signals in the ultrasonic frequency range and said video receiver and copying means includes an on and off control switch responsive to said signals.

3. A system according to claim 1, and second scanning means for sequentially sweeping the raster of essentially different subject matter for producing individually distinct video pulse trains; a video mixer adapted for receiving the video pulse trains from both of said scanning means and for relaying same to the transmitting means, whereby the border lines of said screen establish a distorted image while the balance of the video screen emits a normal picture.

4. A system according to claim 1, wherein said signal translation means includes an optical system for converting said distorted image into a true image.

5. A system according to claim 1, wherein said signal translation means i ncludes electrostatically responsive scanning elements composed of a strip of insulating material secured to portions of said screen and a plurality of thin metal foils having the width of a picture point of the video raster and being disposed between said strip and said screen.

6. A system according to claim 1, wherein said signal translation means includes photoelectrically responsive means composed of a strip of transparent insulating material secured to said screen and photoelectrically responsive resistor elements carried on the outer surface of said strip, each of said resistors having the width of a picture point of the video raster.

7. A system according to claim 4, wherein photoelectric resistor means is disposed in the focal line between said rod and said copying means.

8. A system according to claim 4, wherein said optical system includes at least one cylindrical glass rod adjustably positioned relative to said screen having its longitudinal axis disposed parallel to the horizontal lines of said screen.

9. A system according to claim 8, and an elongated deflecting mirror optically interposed between said glass rod and said screen.

10. A system according to claim 9, wherein said mirror has a concave configuration.

References Cited

UNITED STATES PATENTS

| | | | |
|---|---|---|---|
| 2,164,297 | 6/1939 | Bedford | 178—7.2 |
| 2,307,210 | 1/1943 | Goldsmith | 178—7.85 |
| 2,769,028 | 10/1956 | Webb | 178—6.6 |
| 3,149,201 | 9/1964 | Huber | 178—6.6 |
| 3,277,237 | 10/1966 | Wolfgang | 178—6.6 |

JOHN W. CALDWELL, *Primary Examiner.*

DAVID G. REDINBAUGH, *Examiner.*

J. A. ORSINO, *Assistant Examiner.*